United States Patent [19]

Iwasaki

[11] Patent Number: 4,463,341
[45] Date of Patent: Jul. 31, 1984

[54] SINGLE CONDUCTOR MULTI-FREQUENCY ELECTRIC WIRING SYSTEM FOR VEHICLES

[75] Inventor: Shinichiro Iwasaki, Troy, Mich.

[73] Assignee: Aisin Seiki Kabushiki Kaisha, Kariya, Japan

[21] Appl. No.: 268,904

[22] Filed: Jun. 1, 1981

[51] Int. Cl.³ .................... H04Q 9/00; G08C 15/12
[52] U.S. Cl. .................... 340/310 A; 307/10 R; 340/52 F; 340/825.05; 340/825.76
[58] Field of Search ............ 340/310 A, 52 F, 825.76, 340/825.71, 825.05; 307/10 LS, 10 R, 40

[56] References Cited

U.S. PATENT DOCUMENTS

| | | | |
|---|---|---|---|
| 3,467,835 | 9/1969 | De Cola | 340/310 A |
| 3,525,875 | 8/1970 | Ziomek | 307/10 R |
| 3,651,454 | 3/1972 | Venema et al. | 340/52 F |
| 3,689,886 | 9/1972 | Durkee | 340/310 A |
| 3,729,710 | 4/1973 | Sherwin | 340/310 A |
| 3,886,534 | 5/1975 | Rosen et al. | 340/310 A |
| 3,971,010 | 7/1976 | Foehn | 340/310 A |
| 4,099,157 | 7/1978 | Enabnit | 340/52 F |

FOREIGN PATENT DOCUMENTS 2446554  8/1980  France .............. 340/52 F

OTHER PUBLICATIONS

Toyoda Group Publication–Describing an Electric Wiring System for Vehicles. (Date of Publication Unknown).
Automotive Engineering, Jan. 1981, vol. 89, No. 1; Multiplex System Simplifies Bus Wiring.
Second International Conference on Automotive Electronics, Oct. 29-Nov. 2, 1979; Automotive "Signalbus" Multiplex Wiring System, by R. Foerste.
Second International Conference on Automotive Electronics, Oct. 29-Nov. 2, 1979; A Multiplexed Wiring System for Cars and its Electronics, by J. R. Massoubre and D. L. Reverdin, G. Lezmi.
Automotive Engineering, Aug. 1980, vol. 88, No. 8; Multiplexing Simplifies and Expands Driver Controls.

Primary Examiner—Glen R. Swann, III
Attorney, Agent, or Firm—Oblon, Fisher, Spivak, McClelland & Maier

[57] ABSTRACT

A wiring system for use in vehicles wherein a common single conductor bus is utilized for both power and control function transmission. A plurality of transmitters attached to the bus receive power from the bus and supply control signals to the bus as required. A plurality of receivers, attached to the bus, receive power and the control signals from the bus. Each receiver is tuned to respond only to the particular control signal produced by a single transmitter. Upon receipt of the appropriate control signals, the receivers couple power from the bus to various loads.

6 Claims, 4 Drawing Figures

SINGLE CONDUCTOR MULTI-FREQUENCY ELECTRIC WIRING SYSTEM FOR VEHICLES

BACKGROUND OF THE INVENTION

1. Field of the Invention

The present invention relates, in general, to a novel electric wiring system for use in vehicles.

2. Description of the Prior Art

Vehicles, in particular automobiles, have generally utilized conventional point to point wiring systems for both power and control functions. These systems have proven themselves to be reliable and adequate for many years. However, recently added demands have been placed on vehicular wiring systems due to the increased necessary for complex safety and emission control systems, and due to the public's increasing demand for vehicular amenities. These various demands have greatly increased the size and complexity of vehicular wiring systems.

Such large and complicated wiring systems are increasingly costly to produce due to the ever increasing cost of both labor and materials. Additionally, the reliability and serviceability of these systems have suffered due to the large increase in complexity. Also, the increased size of the wiring systems runs counter to the current trend toward reducing the size of vehicles due to the greatly increased cost of fuel. Thus if a vehicle's wiring system could be simplified, significant reductions in size and weight could be achieved thereby decreasing the fuel consumption of the vehicle. Significant savings in the cost of the vehicle would also occur.

Currently, several solutions to the problems existing with conventional wiring systems have been proposed. Generally these solutions have involved some form of Time Division Multiplexing utilizing digital technology.

FIG. 1 illustrates a typical prior art Time Division System known as a Ring-type system. In this system a central processing unit (CPU) 1 is connected to a power bus 3, a data bus 5, and a clock bus 7. Buses 3, 5, and 7 are continuous wire structures positioned in a generally circular path about the body of the vehicle. A fourth "ground" bus is provided by the body of the vehicle. The central processing unit 1 communicates with a plurality of terminal units 11a through 11d via the bus system. Each terminal unit, in turn, communicates with a plurality of peripheral units 13a through 13d via individual dedicated cables. The peripheral units are directly connected to the various switches, indicators, lights, motors, etc., used in the vehicle. Thus a switch command may be sent via one of the peripheral units 13a located in the vehicle's dashboard through the dashboard terminal unit 11a to the CPU 1 via the bus system and thenceforth onto a motor operated by one of the peripheral units 13c. An operational indicator signal may be sent from the particular peripheral unit 13c to an indicator peripheral unit in 13a by reversing the process. Two-way communication thus takes place under control of the CPU 1.

The prior art time division multiplexing systems, as illustrated in FIG. 1, do achieve a noticeable reduction in the quantity and complexity of the required system wiring; however, this improvement requires the use of numerous complex and costly hardware assemblies in the form of terminal units, peripheral units, and central processing units. These units are both costly to produce and to service in the field. Additionally, it should be noted that a significant quantity of wiring exists in a system in the form of the three buses.

The present invention provides a novel solution to these and numerous other problems existing in prior art vehicular wiring systems.

SUMMARY OF THE INVENTION

Accordingly, one object of the present invention is to provide a novel vehicular wiring system which utilizes a single wire bus in addition to the vehicle ground.

Another object of the invention is to provide a novel wiring system which is small and inexpensive to produce.

Still another object of the invention is to provide a novel wiring system which is highly reliable and easy to service.

Yet another object of the invention is to provide a novel wiring system which is easily adaptable to fit various types of vehicles.

These and other objectives are achieved according to the present invention by providing a novel wiring system wherein an electrically conductive bus is connected to a source of power, such as a vehicle's battery. The bus supplies power to all the systems in the vehicle and additionally acts as a data path. A plurality of transmitters are connected to the bus. Each transmitter receives its operating power from the bus and additionally supplies an AC control signal to the bus upon the activation of a switch connected to the transmitter. The control signal supplied by each transmitter is assigned a specific frequency within the operating frequency range of the system. A plurality of receivers are also connected to the bus. The receivers receive their operating power from the bus and additionally receive the various control signals from the transmitters which appear on the bus. Each receiver is tuned to respond only to the frequency of a control signal supplied to the bus by a particular transmitter. A load is connected to each receiver. Upon the receipt of a control signal having the proper frequency, the receiver acts to supply power from the bus to the load, thereby activating the load. Thus a plurality of load devices may be powered and controlled by means of a single bus.

Alternatively, several such wiring systems may be included within a single vehicle. For example, one bus and its associated transmitter and receiver devices could be directly connected to the vehicle's battery while another bus and its associated equipment could be connected to the battery through the ignition switch of the vehicle. This system allows certain circuits to operate independently of the operational state of the engine.

The transmitters and receivers are constructed from modules which are tuned to the necessary operational frequencies merely by changing a crystal within each module. Thus the modules are readily interchanged within the vehicle thereby making the system highly desirable from a manufacturing and supply logistics standpoint.

BRIEF DESCRIPTION OF THE DRAWINGS

A more complete appreciation of the invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1:
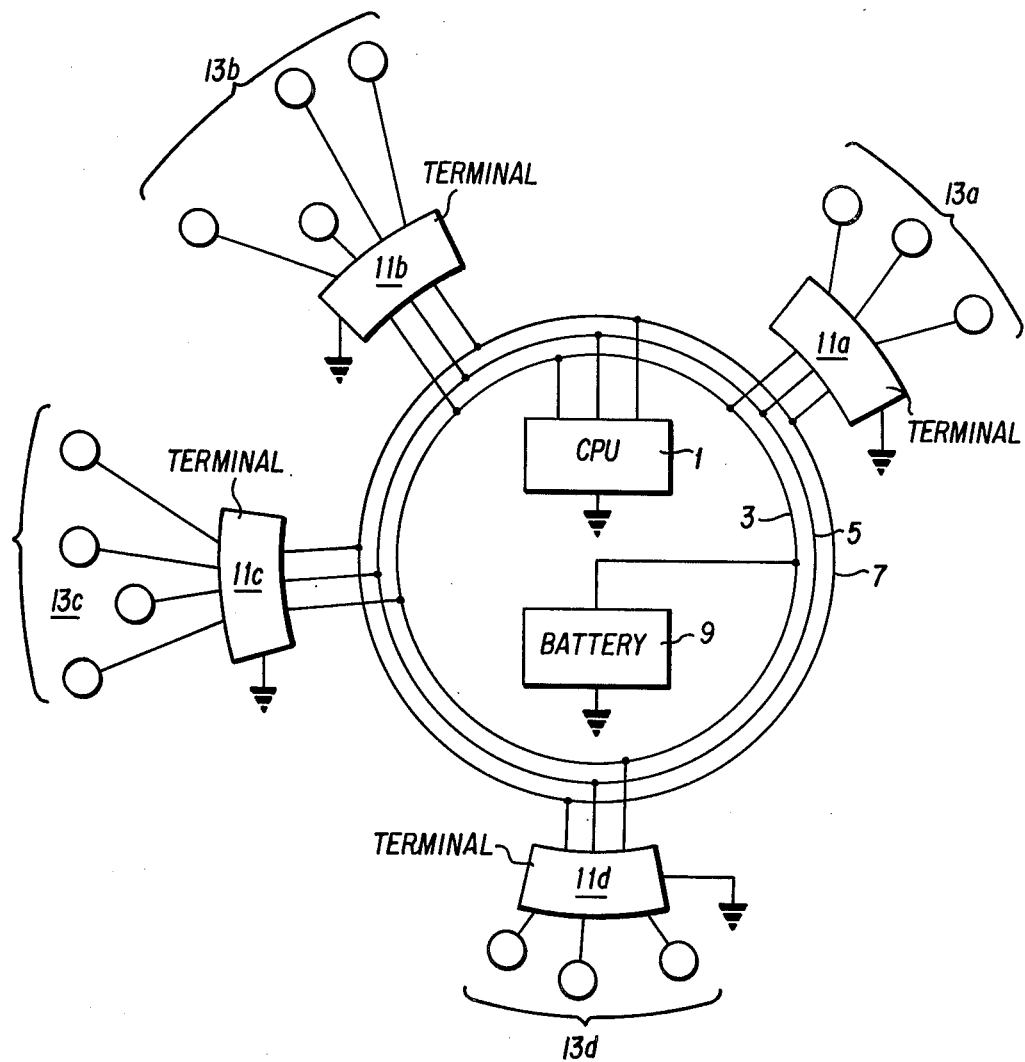
FIG. 1 is a schematic representation of a prior art ring-type wiring system.
Figure 2:
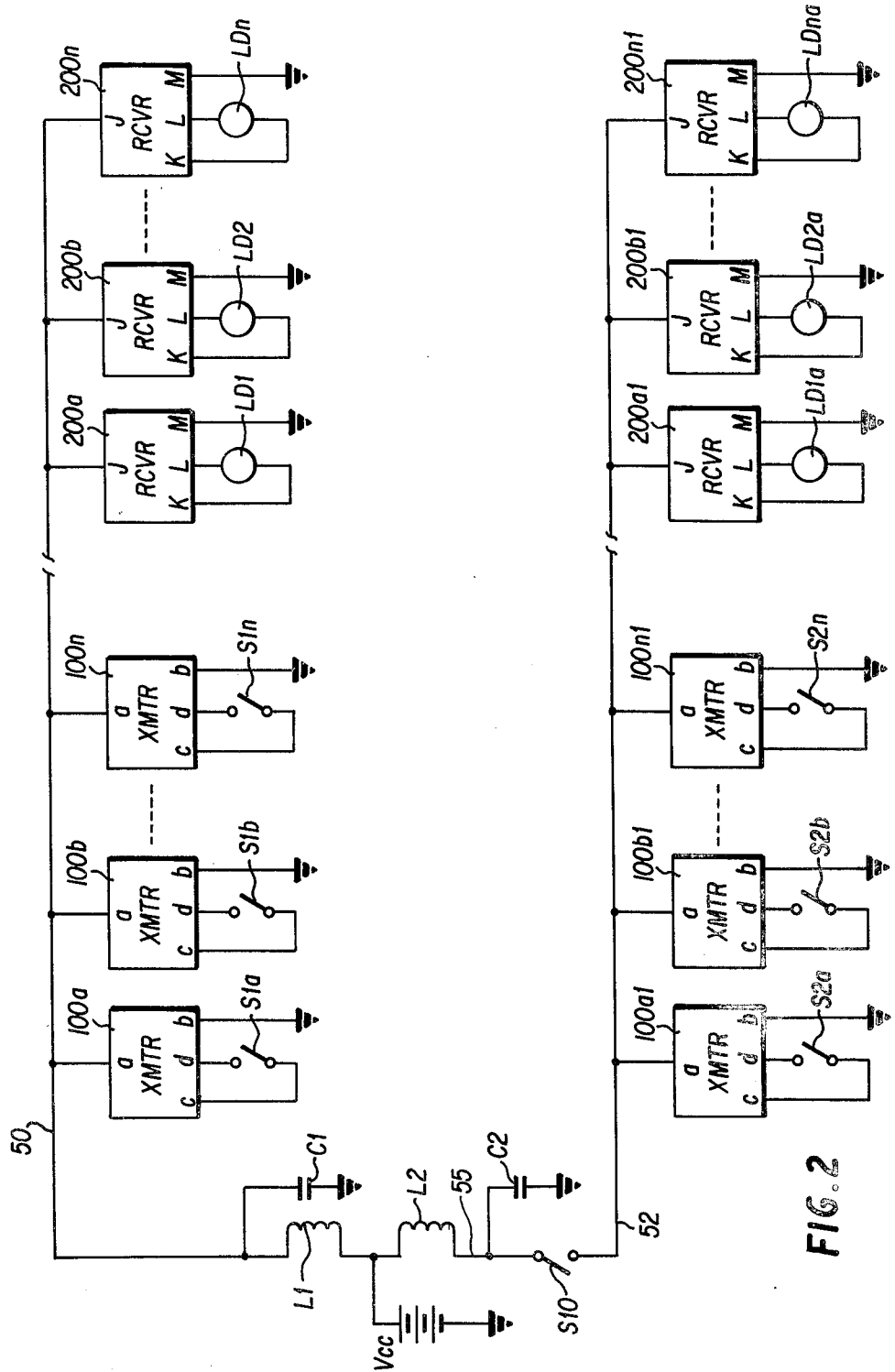
FIG. 2 is a general block diagram illustrating the wiring system of the present invention.

Referring now to the drawings, wherein like reference numerals designate identical or corresponding parts throughout the several views, and more particularly to FIG. 2 thereof, a block diagram of the wiring system of the present invention is illustrated as including a first bus 50 and a second bus 52. The buses 50 and 52 can be made from standard wire or coaxial cable. The first bus 50 is connected to a source of DC power Vcc through a series inductor L1. A capacitor C1 is connected between the bus 50 and the vehicle ground (vehicle chassis). The second bus 52 is connected to the DC power source Vcc through a series inductor L2 and the vehicle's ignition switch S10. A capacitor C2 is connected between the vehicle ground and the junction point 55 of the inductor L2 and the switch S10. The power source Vcc is the vehicle's battery which is typically a 12 volt device. The inductor L1 and the capacitor C1 act as a first filter circuit, while inductor L2 and capacitor C2 form a second filter circuit. These filter circuits act to prevent AC signals appearing on the bus 50 from reaching the bus 52 via the common power source Vcc and vice versa.

The bus 50 is utilized to power and control circuits within the vehicle, such as lighting circuits, which must be functional regardless of the operational status of the vehicle's engine, while the bus 52 is utilized to power and control circuits, such as the power window and wiper circuits, which are to be utilized only when the engine is in operation. As such, the entire electrical needs of the vehicle are supplied and controlled by the two buses 50 and 52. It should be understood that the wiring system could be further simplified by limiting the system to a single bus connected either directly to the power source Vcc or indirectly to the power source through the ignition switch. Alternatively, additional buses could be added, if desired.

Connected to bus 50 are a plurality of transmitters 100a through 100n and a plurality of receivers 200a through 200n. Similarly, a plurality of transmitters 100a1 through 100n1 and a plurality of receivers 200a1 through 200n1 are connected to the bus 52. Details regarding the particulars of the transmitters and receivers will be presented below.

Each transmitter receives its DC power from its associated bus (50 or 52) and selectively applies an AC control signal having a specific frequency to that bus. Switches S1a through S1n and S2a through S2n are each individually connected to a single respective transmitter for controlling the AC control signal output thereof. The AC output control signals from the transmitters occupy a frequency band lying between 10 and 20 kHz, with each transmitter being assigned a specific frequency at 100 Hz intervals.

Similarly, each receiver is connected to receive DC power and AC control signals from its associated bus (50 or 52). Each receiver is tuned to a particular frequency and thus responds only to the AC control signal output of a particular transmitter. For example, transmitter module 100a and receiver module 200a could form a communications link operating at a frequency F1, transmitter 100b and receiver 200b could operate on frequency F2, etc. The output of each receiver 200a through 200n and 200a1 through 200n1 is connected to an associated load LD1 through LDn and LD1a through LD1n, respectively. These loads may take the form of indicator lamps, low level lighting circuits, or relay devices for controlling high current loads such as the headlights and motor devices. Thus it should be clearly apparent that a particular switch may control a particular load via its associated receiver and transmitter over one of the buses. Therefore, each bus acts as a common power and data link for a plurality of circuits thereby achieving a substantial reduction in the necessary wiring when compared to a conventional dedicated wiring system or to a ring-type time division multiplexing system.

Figure 3:
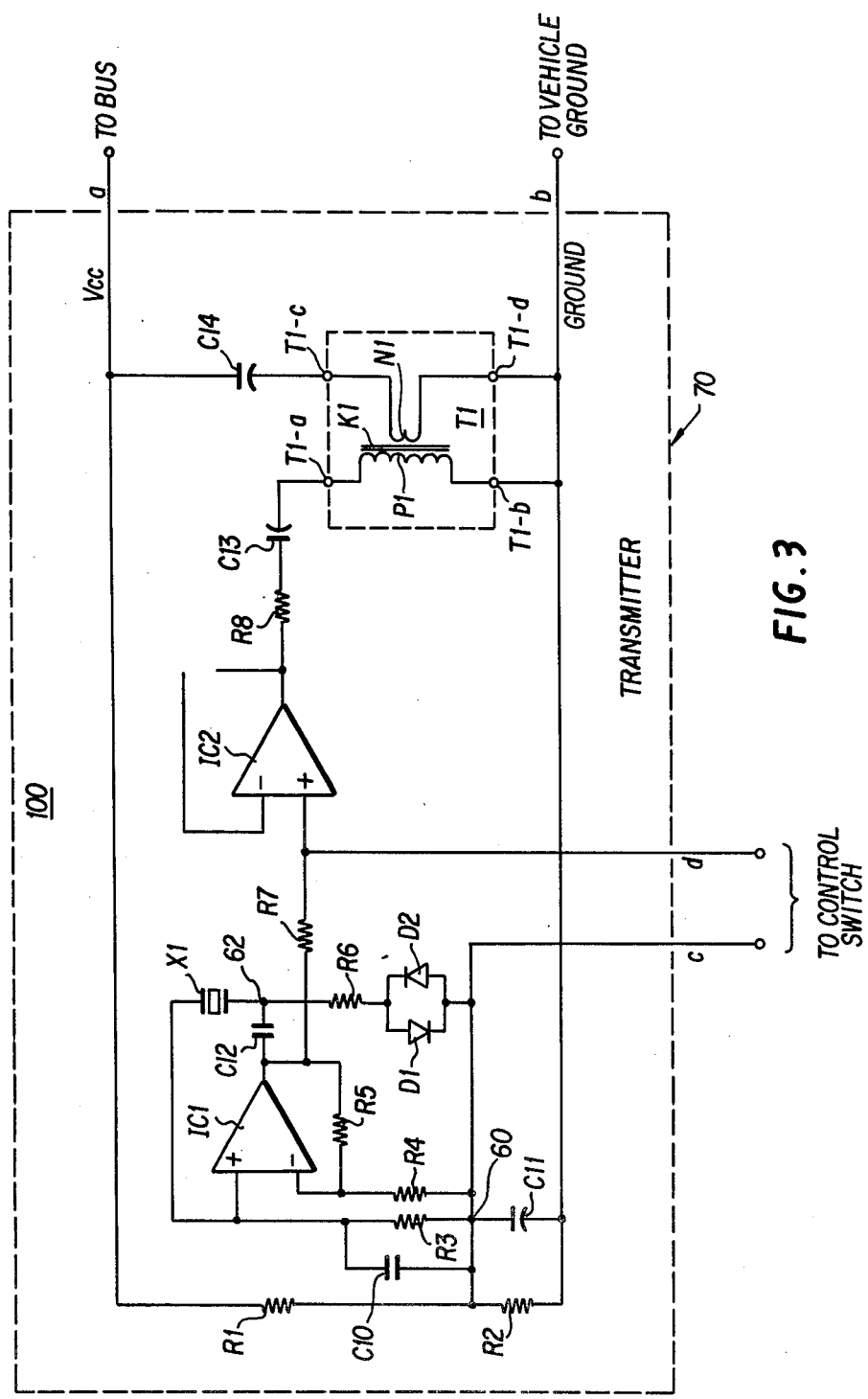
FIG. 3 is a schematic diagram of a preferred embodiment of a transmitter module used with the wiring system shown in FIG. 2.

FIG. 3 is a schematic diagram of a preferred embodiment of a transmitter module 100. The transmitter module 100 is utilized to form the transmitters 100a through 100n1 illustrated in FIG. 2 and thus its external terminals a, b, c, and d are appropriately indicated for each transmitter 100a through 100n1 in FIG. 2.

Terminal a of the transmitter module 100 is connected to one of the buses (50 or 52) and terminal b is connected to the vehicle ground (vehicle chassis) as illustrated in FIG. 2. Resistors R1 and R2 are equal in value and are connected in series between the terminals a (Vcc) and b (ground) to form a voltage divider such that the circuit junction point 60 has a DC voltage of $\frac{1}{2}$ Vcc which would be 6 volts in a typical 12 volt vehicle system. Capacitor C11 is coupled across the resistor R2 to provide a low impedance path for AC signals thereby effectively placing the junction point 60 at AC ground. A resistor R4 is connected between the junction point 60 and the negative input of an operational amplifier IC1. A resistor R5 is coupled between the output and the negative input of the operational amplifier IC1 and acts to determine the negative feedback of IC1 along with the resistor R4. A DC blocking capacitor C12 is connected between the output of the operational amplifier IC1 and a junction point 62 to prevent any DC signals appearing at the output of IC1 from reaching the junction point 62. A crystal X1 having a resonant frequency Fr is coupled between the junction point 62 and the positive input of IC1 which is further connected to the junction point 60 via the parallel combination of resistor R3 and a capacitor C10. The values of capacitor C10 and resistor R3 are adjusted such that the time constant of C10 and R3 is equal to the reciprocal of $2\pi$ times the resonant frequency Fr of the crystal X1. The junction point 62 is connected to the junction point 60 by means of the series combination of a resistor R6 and two back-to-back diodes D1 and D2. The values of the resistors R3, R4, R5, and R6 are adjusted such that the gain of the circuit including the operational amplifier IC1 is slightly larger than unity. The circuit thus forms an oscillator which produces a sine wave output signal having a frequency of Fr which is the resonant frequency of the crystal X1. The diodes D1 and D2 combine with the resistor R6 to form a voltage variable resistive element which acts to improve the distortion characteristics of the sine wave output of the oscillator.

The sine wave output of the operational amplifier IC1 is coupled through a series resistor R7 to the positive input of a second operational amplifier IC2. The output of IC2 is connected back to its negative input and thus the amplifier IC2 forms a unity gain non-inverting amplifier. The amplifier IC2 thus acts to isolate the output of the oscillator from the remaining portions of the transmitter module 100 thereby stabilizing the output of the oscillator. The operational amplifiers IC1 and IC2 can be any standard device such as the commonly available 741 series. Although not illustrated in FIG. 3, these devices derive the necessary DC power for their internal operation from the bus terminal a.

The junction point 60 is coupled to a terminal c and the positive input of the operational amplifier IC2 is coupled to a terminal d of the transmitter module 100. The terminals c and d are externally connected to a control switch (S1$a$ through S2$n$) as is clearly shown in FIG. 2. When the terminals c and d are open circuited by the external control switch, the sine wave output of IC1 is transmitted to the positive input of IC2 through the series resistor R7. When the terminals c and d are short-circuited by the external control switch, the positive input of the operational amplifier IC2 is placed at the AC ground level and thus the input and output of IC2 are both zero. The series resistor R7 acts to prevent the output of IC1 from being loaded down by the control switch and thus acts to maintain a constant frequency of oscillation regardless of the state of the control switch.

The sine wave output of the operational amplifier IC2 is coupled to a first terminal T1-$a$ of the primary winding P1 of an output transformer T1 via the series combination of a resistor R8 and a DC blocking capacitor C13. The capacitor C13 acts to prevent any DC voltage appearing at the output of IC2 from reaching the primary winding P1. The second terminal T1-$b$ of the primary winding P1 is connected to the vehicle ground via the terminal b of the transmitter module. A first terminal T1-$c$ of the secondary winding N1 of the output transformer T1 is connected to the bus terminal a of the transmitter module through a capacitor C14. The second terminal T1-$d$ of the secondary winding N1 is connected to ground through the terminal b of the transmitter module. Capacitor C14 acts to couple the AC sine wave output signal appearing at the secondary winding terminal T1-$c$ to the bus terminal a while preventing the DC voltage Vcc on the bus from reaching the secondary winding of the transformer T1. The transmitter module 100 thus operates to receive DC power from the bus terminal a and to supply an AC signal having a frequency Fr to the bus terminal a as controlled by the external switch connected between terminals c and d of the module.

The output transformer T1 is a step-down transformer which operates to match the impedance of the output of the operational amplifier IC2 to the impedance of the bus (50 or 52) to which the transmitter module 100 is connected. The transformer is preferably wound on a toroidal core K1 and has a primary to secondary turns ratio of typically 100 to 1. In a preferred embodiment, the core K1 is formed by winding a plurality of turns of a magnetically soft high permeability amorphous metal tape to form a toroidal-shaped core having a 5 mm inner diameter, a 10 mm outer diameter, and a 6 mm height. The use of the toroidal core results in a transformer of small size possessing a desirable high turns ratio. Magnetically soft amorphous metal materials are desirable because they exhibit high permeability ($\mu_{max} > 10^3$) and a low level of coercive force ($< 1.0$ Oe) while exhibiting high mechanical strength and excellent stability. Such materials are described in Hasegawa et al, "Soft Magnetic Properties of Metallic Glasses—Recent Developments", J. Appl. Phys. 50(3), March 1979, pp. 1551–1556. Magnetically soft amorphous materials are sold under the trademark METGLAS (TM) by Allied Chemical Corp.

The transmitter module 100 is, of course, utilized to form the various transmitters 100$a$ through 100$n$1 as previously described. The frequency of each transmitter is set by means of the crystal X1. Thus the transmitter module 100 is easily adapted to produce an output signal of any particular frequency within the design range of the vehicle wiring system.

The transmitter module 100 is preferably encapsulated or potted to enhance its ruggedness and to protect it from environmental hazards frequently encountered in vehicles. Also, the module is preferably enclosed in a metal shield, such as shown by reference numeral 70 in FIG. 3, so as to prevent radio frequency interference (RFI) problems.

Figure 4:
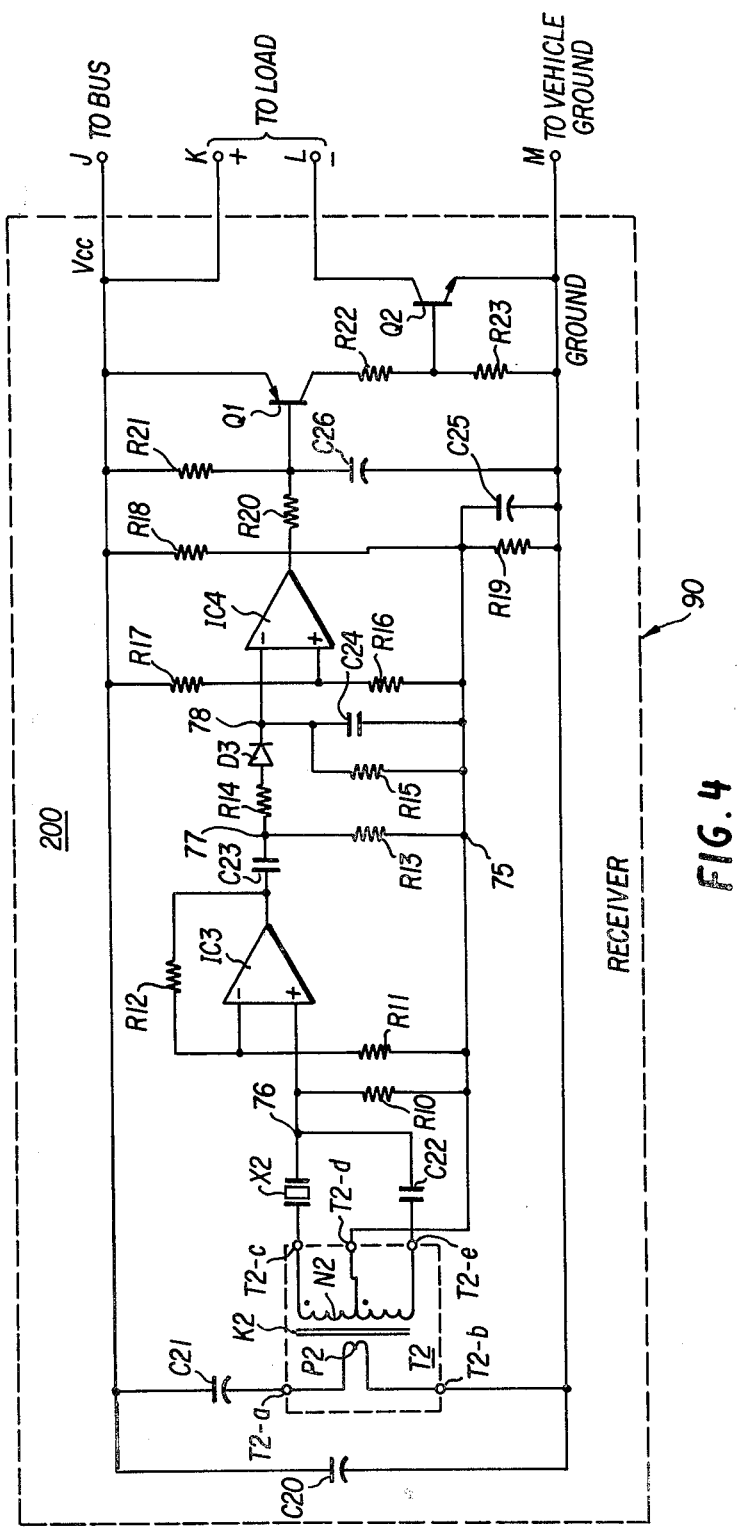
FIG. 4 is a schematic diagram of a preferred embodiment of a receiver module used with the system shown in FIG. 2.

FIG. 4 illustrates a preferred embodiment of a receiver module 200 which is utilized to form the various receivers 200$a$ through 200$n$1 shown in FIG. 2. The external terminals j, k, l and m of the receiver module 200 are appropriately designated for each receiver shown in FIG. 2.

Terminal j of the receiver module 200 is connected to one of the buses (50 or 52) and the terminal m is connected to the vehicle ground as shown in FIGS. 2 and 4. Resistors R18 and R19 are equal in value and are connected in series between the bus terminal j and the ground terminal m of the receiver module. Resistors R18 and R19 thus form a voltage divider which produces a potential of ½ Vcc at junction point 75. The potential at junction point 75 would thus be 6 volts for a typical 12 volt vehicle system. A bypass capacitor C25 is connected across the resistor R19 thereby placing the junction point 75 at ground level for AC signals. A capacitor C20 is connected between the bus terminal j and the ground terminal m to absorb random noise signals thereby improving the reliability of the receiver module.

AC signals appearing at the bus terminal j are coupled through a capacitor C21 to a first terminal T2-$a$ of the primary winding P2 of an input transformer T2. The second terminal T2-$b$ of the primary winding P2 is connected to the ground terminal m. The capacitor C21 acts to prevent the DC potential Vcc appearing at the bus terminal j from flowing through the primary winding P2. The transformer T2 is a step-up impedance matching transformer having a typical primary to secondary turns ratio of 1 to 200, with the secondary winding being center-tapped. The transformer is wound on a toroidal core K2 formed by winding a plurality of turns of magnetically soft high-permeability amorphous metal tape as described above with respect to the toroidal core K1 of the transformer T1 shown in FIG. 3.

The center-tap terminal T2-$d$ of the secondary winding N2 of the transformer T2 is connected to the AC ground junction point 75. Thus the transformed AC signal appearing at the transformer secondary terminal T2-$c$ is 180 degrees out of phase with respect to the AC signal appearing at the secondary terminal T2-$e$. The AC signal appearing at the secondary terminal T2-$c$ is coupled through a crystal X2 having a resonant frequency Fr to a circuit junction point 76. A resistor R10 is connected between the junction point 76 and the AC ground junction point 75. Crystal X2 is a typical crystal device in that its impedance is at its minimum value at the resonant frequency Fr. Thus crystal X2 tends to pass AC signals having frequencies at or near the frequency Fr to the exclusion of all other signals. The AC signal passed by the crystal X2 is developed across the resistor R10. A capacitor C22 is connected between the secondary terminal T2-e and the circuit junction point 76. The capacitor C22 acts to phase shift the 180 degrees out of phase AC signal appearing at the terminal T2-e. The value of the capacitor C22 is set equal to the value of the internal capacitance of the crystal X2 as illustrated in phantom in FIG. 4. The signal supplied by the capacitor C22 to the junction point 76 thus acts to cancel the AC signal coupled to the junction point 76 by means of the internal capacitance Co of the crystal. The transformer T2, the crystal X2, and the capacitor C22 therefore act to form an input filter device having very desirable sharp band-pass characteristics centered at the crystal frequency Fr.

The filtered AC signal appearing at junction point 76 is coupled to the positive input of an operational amplifier IC3 which is connected as a non-inverting amplifier. A feedback network including resistors R11 and R12 operates to set the gain of the amplifier. The AC output signal of the operational amplifier IC3 is coupled by means of a capacitor C23 to a junction point 77 where it is developed across a resistor R13. Capacitor C23 acts to prevent any DC signals from reaching the junction point 77.

The AC signal appearing at junction point 77 is half-wave rectified by the series combination of resistor R14 and diode D3 coupled between the junction points 77 and 78. The half-wave rectified signal is integrated by a capacitor C24 coupled between the junction points 78 and 75. Resistor R15, coupled across the capacitor C24, slowly discharges capacitor C24 thereby allowing the level of the integrated signal appearing at the junction point 78 to slowly follow the amplitude of the AC signal output of the operational amplifier IC3.

The integrated signal at the junction point 78 is coupled to the negative input of an operational amplifier IC4. The positive input of IC4 is coupled to the junction of a series connected pair of resistors R16 and R17 which are connected between the junction point 75 and the bus terminal j and act as a voltage divider. The operational amplifier IC4 acts as a comparator circuit which compares the integrated signal at junction point 78 to the DC level set by the resistors R16 and R17. The comparator IC4 has a positive output when the integrated signal at junction point 78 is at a low level (no signal having a frequency Fr appearing at bus terminal j), and has a negative output when the signal at junction 78 is more positive than the DC level set by the resistors R16 and R17.

The output of the comparator IC4 is coupled through a series resistor R20 to the base of a PNP transistor Q1. A resistor R21 is connected between the bus terminal j and the base of Q1 and a capacitor C26 is connected between the base of Q1 and the ground terminal m. When no signal having a frequency Fr appears on the bus terminal j, the output of the comparator IC4 is positive and the capacitor C26 becomes charged to the DC bus voltage Vcc through the resistor R21. Upon the detection of a signal having a frequency Fr, the output of the comparator IC4 becomes negative, and the capacitor C26 begins to discharge thereby causing the voltage at the base of transistor Q1 to slowly become negative with respect to the emitter of Q1 which is connected to the bus terminal j. When a sufficiently low voltage is reached at the base of Q1, the transistor turns on and a current flows from the bus terminal j to ground through Q1 and its series connected collector resistors R22 and R23. The capacitor C26 thus acts as a delay circuit to prevent noise spikes occurring within the receiver module from erroneously turning transistor Q1 on.

The base of an NPN transistor Q2 is connected to the junction of the collector resistors R22 and R23. The transistor Q2 is normally turned off when no signal is detected by the receiver module. However, when a signal is detected and transistor Q1 turns on, the base of transistor Q2 becomes positive with respect to its emitter and Q2 turns on thereby coupling the load terminal 1 of the receiver module to the vehicle ground bus m. Thus when a signal is detected, current flows from the bus terminal j to the load terminal k, through the load and load terminal 1, and back through the transistor Q2 to the vehicle ground terminal m.

The receiver module 200 is utilized to form the receivers 200a through 200n1 shown in FIG. 2, as previously described. The receiver modules are tuned by merely changing the crystal X2 to a crystal having the desired reception frequency. The receiver module 200 is preferably encapsulated or potted to protect it from environmental hazards. Additionally, in order to prevent radio frequency interference, the module is preferably enclosed by a metal shield 90 as shown in FIG. 4. The operational amplifiers IC3 and IC4 are standard devices such as the common 741 series. These devices receive their operating voltages (not illustrated) from the bus terminal j.

The use of the transmitter module 100 of FIG. 3 and the receiver module 200 of FIG. 4 is highly advantageous in the wiring system of the present invention because these modules are easily manufactured using readily available components. They are small and they are versatile because they can be adapted to any such wiring system by simply changing the frequency of their crystals X1 and X2.

Although the subject invention has been explained using the transmitter and receiver circuits shown in FIGS. 3 and 4, it should not be considered to be limited to these circuits as other circuits could also be devised which would provide satisfactory results. Similarly, although the present invention has been explained with respect to an automobile wiring system, the system would provide similar advantages when utilized with other vehicles such as ships, planes, trains, etc. The system would also be useful in non-vehicle applications. Also, it should be noted that the present invention should not be considered to be limited to the two bus system illustrated herein as single bus systems or multi-bus systems could be equally utilized to good advantage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A wiring system comprising:

a source of electrical power;

at least one electrically conductive bus coupled to said source of power;

transmitting means coupled to receive a control input from a control source and coupled to said at least one conductive bus for receiving said power from said bus and for superimposing at least one control signal on said bus in response to said control input; and receiver means coupled to said at least one conductive bus for receiving said power and said control signal from said bus and for coupling said power from said bus to a load in response to said control signal;

wherein said receiver means comprises:

bandpass filter means coupled to said at least one bus for receiving said control signal from said bus and for rejecting any other signals appearing on said bus, comprising, input transformer means coupled to said at least one bus for stepping up the voltage levels of signals appearing on said bus, and crystal filter means coupled to the output of said input transformer means for filtering said signals appearing on said bus, said crystal filter means coupling said received control signal to an output of said filter means;

detector means coupled to said output of said crystal filter means for generating a switching signal upon the detection of the presence of said received control signal at the output of said filter means; and power switch means coupled between said at least one bus and said load and coupled to receive said switching signal from said detector means for coupling said power from said at least one bus to said load in response to said switching signal.

2. A wiring system comprising:

a source of electric power;

at least one electrically conductive bus coupled to said source of power, said bus formed of a single conductor;

a plurality of transmitter means coupled to said at least one bus for receiving power from said at least one bus, each of said plurality of transmitter means being coupled to a particular one of a plurality of control sources for receiving a control input from said particular one control source, said each transmitter means including a crystal oscillator means for generating a control signal having a specific frequency in response to said control input and superimposing said control signal on said bus; and a plurality of receiver means coupled to said at least one bus for receiving power and control signals from said bus, each of said receiver means including crystal filter means tuned to a respective frequency generated by one of said plurality of transmitter means and coupled to a respective load for supplying power from said bus to said load in response to the receipt of said particular control signal having a frequency to which said each crystal filter means is turned;

wherein said receiver means comprises:

said crystal filter means comprising crystal bandpass filter means coupled to said at least one bus for receiving said control signal from said bus and for rejecting any other signals appearing on said bus, said filter means coupling said received control signal to an output of said filter means;

detector means coupled to said output of said filter means for generating a switching signal upon the detection of the presence of said received control signal to the output of said filter means; and power switch means coupled between said at least one bus and said load and coupled to receive said switching signal from said detector means for coupling said power from said at least one bus to said load in response to said switching signal;

wherein said crystal bandpass filter means comprises:

input transformer means coupled to said at least one bus for stepping up the voltage levels of signals appearing on said bus; and a crystal bandpass filter coupled to the output of said input transformer means for filtering said signals appearing on said bus.

3. The wiring system as recited in claim 2, wherein said transmitter means comprises:

switch means coupled to receive said control signal from said crystal oscillator means and coupled to receive said control input from said control source for coupling said control signal to an output of said switch means in response to said control input; and output transformer means coupled between said output of said switch means and said at least one bus for supplying said control signal received from said switch means to said at least one bus.

4. The wiring system as recited in claim 3, wherein said output transformer means includes a toroidal-shaped core, said core including a plurality of turns of a magnetically soft high permeability amorphous metal tape.

5. The wiring system as recited in claim 2, wherein said input transformer means includes a toroidal-shaped core, said core including a plurality of turns of a magnetically soft high permeability amorphous metal tape.

6. The wiring system as recited in claim 1 or claim 2, which further comprises:

filter means coupled between said electric power source and said at least one bus for preventing AC signals appearing on said bus from reaching said power source.

* * * * *